(12) United States Patent
Arima

(10) Patent No.: US 11,206,333 B2
(45) Date of Patent: Dec. 21, 2021

(54) IMAGE READING AND LEARNING APPARATUS, METHOD, AND PROGRAM PRODUCT FOR DETERMINING A MISSING PAGE USING A LEARNED MODEL AND DERIVING THE LEARNED MODEL

(71) Applicant: CANON KABUSHIKI KAISHA, Tokyo (JP)

(72) Inventor: Makoto Arima, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/028,215

(22) Filed: Sep. 22, 2020

(65) Prior Publication Data

US 2021/0099582 A1    Apr. 1, 2021

(30) Foreign Application Priority Data

Sep. 27, 2019   (JP) .............................. JP2019-177784

(51) Int. Cl.
*H04N 1/00*   (2006.01)
*G06N 3/02*   (2006.01)

(52) U.S. Cl.
CPC ........... *H04N 1/00037* (2013.01); *G06N 3/02* (2013.01); *H04N 1/00005* (2013.01); *H04N 1/00013* (2013.01); *H04N 1/0044* (2013.01); *H04N 1/00068* (2013.01); *H04N 1/00074* (2013.01)

(58) Field of Classification Search
CPC ...................................... H04N 1/00002–00092
See application file for complete search history.

(56) References Cited

U.S. PATENT DOCUMENTS

2008/0193051 A1*  8/2008  Murata .............. H04N 1/00801
                                                       382/309
2009/0240982 A1*  9/2009  Ogasawara ........ G03G 15/5025
                                                       714/16

FOREIGN PATENT DOCUMENTS

JP    2016178451 A    10/2016

* cited by examiner

*Primary Examiner* — Scott A Rogers
(74) *Attorney, Agent, or Firm* — Rossi, Kimms & McDowell LLP

(57) ABSTRACT

There is provided an image reading apparatus including a reading unit configured to sequentially read respective pages of a target original consisting of a plurality of pages to generate read images, and a determining unit configured to determine whether there is a missing page in the read images. The determining unit is configured to determine whether there is a missing page in the read images by applying, to a learned model, determination data based on a pair of consecutively-generated read images of the target original. The learned model is a model that has been derived through machine teaming using input data based on image pairs of consecutive pages and image pairs of non-consecutive pages of the original for learning, and training data that indicates whether each image pair is a pair of consecutive pages.

21 Claims, 13 Drawing Sheets

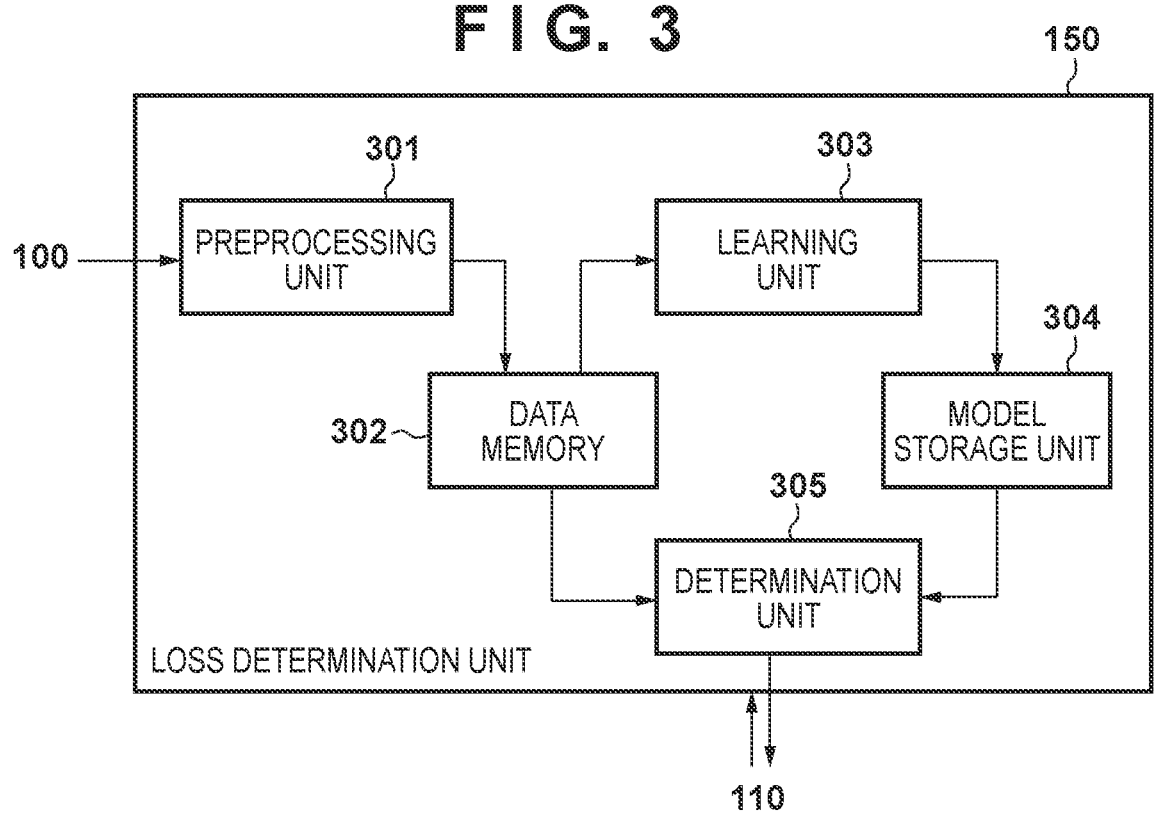

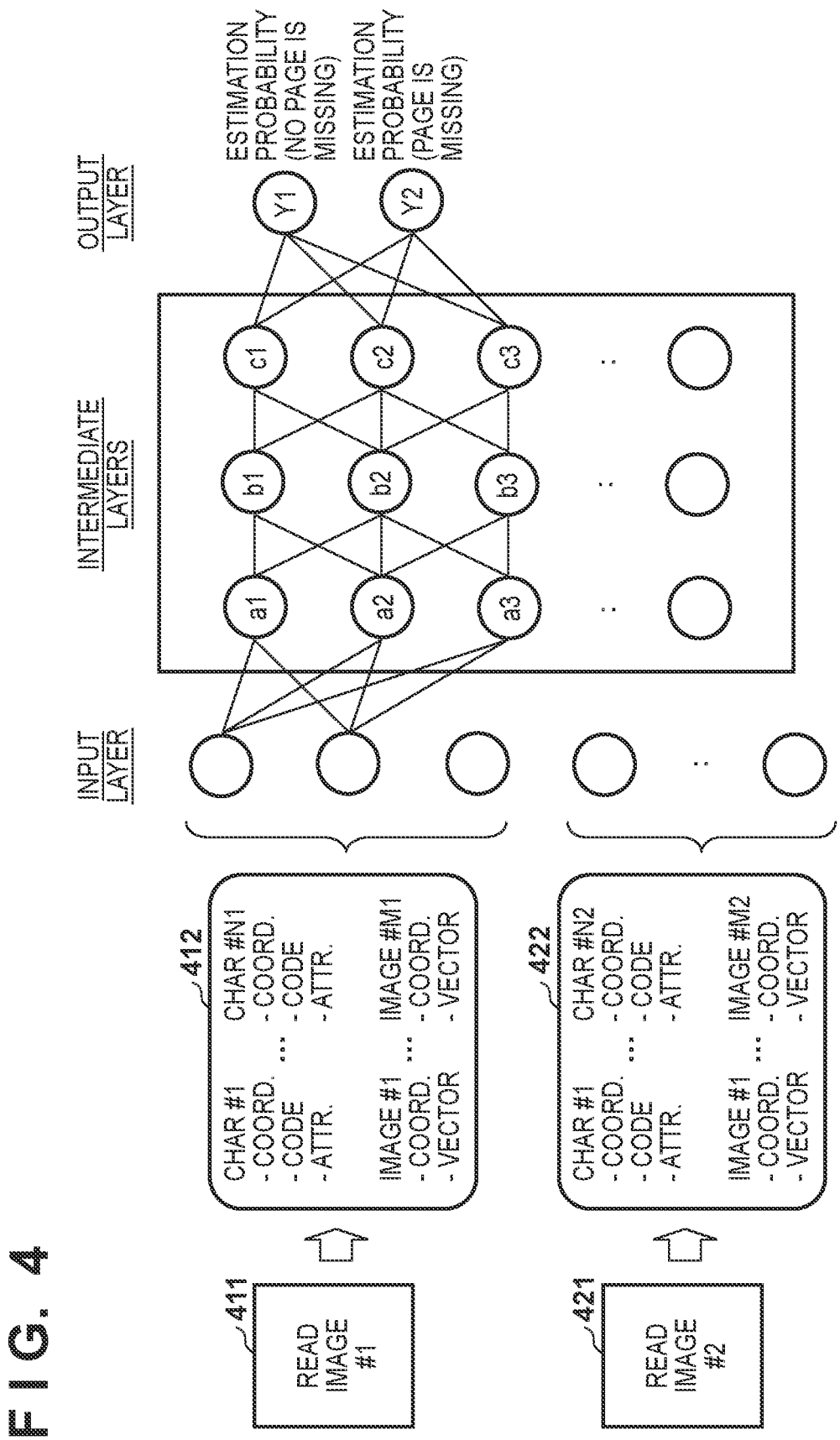

DATA FOR LEARNING (NO PAGE IS MISSING) — 510

| PAIR ID | FIRST IMAGE | SECOND IMAGE | EXPECTED VALUE | |
|---|---|---|---|---|
| | | | Y1 | Y2 |
| 1-1 | No.1 | No.2 | 1.0 | 0.0 |
| 1-2 | No.2 | No.3 | 1.0 | 0.0 |
| 1-3 | No.3 | No.4 | 1.0 | 0.0 |
| 1-4 | No.4 | No.5 | 1.0 | 0.0 |
| 1-5 | No.2 | No.1 | 1.0 | 0.0 |
| 1-6 | No.3 | No.2 | 1.0 | 0.0 |
| : | : | : | : | : |

DATA FOR LEARNING (PAGE IS MISSING) — 520

| PAIR ID | FIRST IMAGE | SECOND IMAGE | EXPECTED VALUE | |
|---|---|---|---|---|
| | | | Y1 | Y2 |
| 2-1 | No.1 | No.3 | 0.0 | 1.0 |
| 2-2 | No.2 | No.4 | 0.0 | 1.0 |
| 2-3 | No.3 | No.5 | 0.0 | 1.0 |
| 3-1 | No.1 | No.4 | 0.0 | 1.0 |
| 3-2 | No.2 | No.5 | 0.0 | 1.0 |
| : | : | : | : | : |

FIG. 6
NOTIFICATION
⚠ MISSING PAGE DETECTED IN THE ORIGINAL. SELECT STOP READING OR CONTINUE
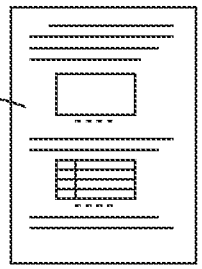
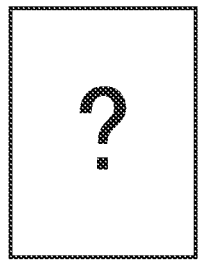
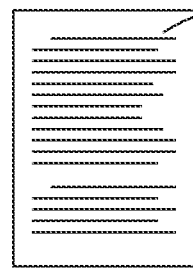
601  602
611 [ STOP READING ]    [ CONTINUE ] 612
FIG. 7
RE-EXECUTION
⚠ ADD PAGE SUBSEQUENT TO FOLLOWING PAGE TO THE ORIGINAL, SET THE ORIGINAL ONTO ADF, AND SELECT START BUTTON
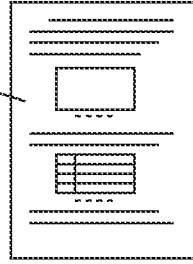
701
711 [ CANCEL ]    [ START ] 712

IMAGE READING AND LEARNING
APPARATUS, METHOD, AND PROGRAM
PRODUCT FOR DETERMINING A MISSING
PAGE USING A LEARNED MODEL AND
DERIVING THE LEARNED MODEL

BACKGROUND OF THE INVENTION

Field of the Invention

The present disclosure relates to an image reading apparatus, a learning apparatus, a method and a storage medium.

Description of the Related Art

A scanner device that feeds respective pages of an original consisting of a plurality of pages set on a document tray using an auto-document feeder (ADF) to sequentially read the respective pages has been generally known. Instead of using the ADF, a user can also carry out reading to obtain read images across the plurality of pages by setting the original onto a document platen covered by a pressing plate repeatedly while flipping its pages. There also exists a scanner device equipped with a unit for automatically flipping pages.

Regarding those scanner devices, a missing page sometimes occurs in a sequence of read images when sequentially reading respective pages of an original due to "double feed" by the ADF or page flipping failure made by a user or a device. The "double feed" refers to a phenomenon that an ADF conveys multiple sheets in a state where the sheets overlap with each other. There is also a possibility that the original itself set on the document tray by a user lacks a page which is in fact needed. If there is a missing page in the sequence of read images, it is not possible to recover the missing page only from image data and a proper original needs to be read by the scanner device again to address the missing page.

Japanese Patent Laid-Open No. 2016-178451 proposed a technique to extract a page number included in each of read images based on layout analysis and character recognition and to compare the number of pages calculated from the extracted page numbers with the number of sheets of the original counted during reading it.

SUMMARY OF THE INVENTION

However, the technique that relies only on page numbers to determine a missing page cannot detect a missing page for an original which does not include page numbers.

In light of the foregoing, it is desirable to allow for determining whether or not there is a missing page in read images of an original taking information other than page numbers in the original into consideration as well.

According to an aspect, there is provided an image reading apparatus including: a reading unit configured to sequentially read respective pages of a target original consisting of a plurality of pages to generate read images of the respective pages; and a determining unit configured to determine whether there is a missing page in the read images of the target original generated by the reading unit. The determining unit is configured to determine whether there is a missing page in the read images of the target original by applying, to a learned model, determination data based on a pair of consecutively-generated read images of the target original. The learned model is a model that has been derived through machine learning using: input data based on image pairs of consecutive pages of an original for learning and image pairs of non-consecutive pages of the original for learning; and training data that indicates whether each image pair is a pair of consecutive pages.

According to another aspect, there is provided an image reading apparatus including: a reading unit configured to sequentially read respective pages of a target original consisting of a plurality of pages to generate read images of the respective pages; and a detecting unit configured to detect a value of a consecutive number element described in each read image by applying, to a learned model, detection data based on each read image of the target original. The learned model is a model that has been derived through machine learning using: input data based on an image of each page of an original for learning; and training data that indicates a value of a consecutive number element described in each page. The image reading apparatus further includes a determining unit configured to determine whether there is a missing page between a first read image and a second read image of the target original based on relationship between a value of the consecutive number element detected by the detecting unit for the first read image and a value of the consecutive number element detected by the detecting unit for the second read image.

According to another aspect, there is provided a learning apparatus including: an obtaining unit configured to obtain input data based on image pairs of consecutive pages of an original for learning and image pairs of non-consecutive pages of the original for learning, and training data that indicates whether each image pair is a pair of consecutive pages; and a learning unit configured to derive, through machine learning using the input data and the training data obtained by the obtaining unit, a learned model for determining whether there is a missing page in read images of a target original consisting of a plurality of pages.

According to another aspect, there is provided a learning apparatus including: an obtaining unit configured to obtain input data based on an image of each page of an original for learning, and training data that indicates a value of a consecutive number element described in each page; and a learning unit configured to derive, through machine learning using the input data and the training data obtained by the obtaining unit, a learned model for detecting a value of a consecutive number element described in each page from detection data based on a read image of each page of a target original consisting of a plurality of pages.

Further features of the present invention will become apparent from the following description of exemplary embodiments (with reference to the attached drawings).

BRIEF DESCRIPTION OF THE DRAWINGS

FIG. 3 is a block diagram illustrating an example of a detailed configuration according to a first embodiment example of a loss determination unit shown in FIG. 2;

FIG. 4 is an explanatory diagram for describing a learning mechanism according to the first embodiment example;

FIG. 6 is an explanatory diagram illustrating an example of a GUI that may be displayed on a screen when it is determined that there is a missing page;

FIG. 7 is an explanatory diagram illustrating an example of a GUI that may be displayed on a screen when re-executing reading after detecting a missing page;

DESCRIPTION OF THE EMBODIMENTS

Figure 1:
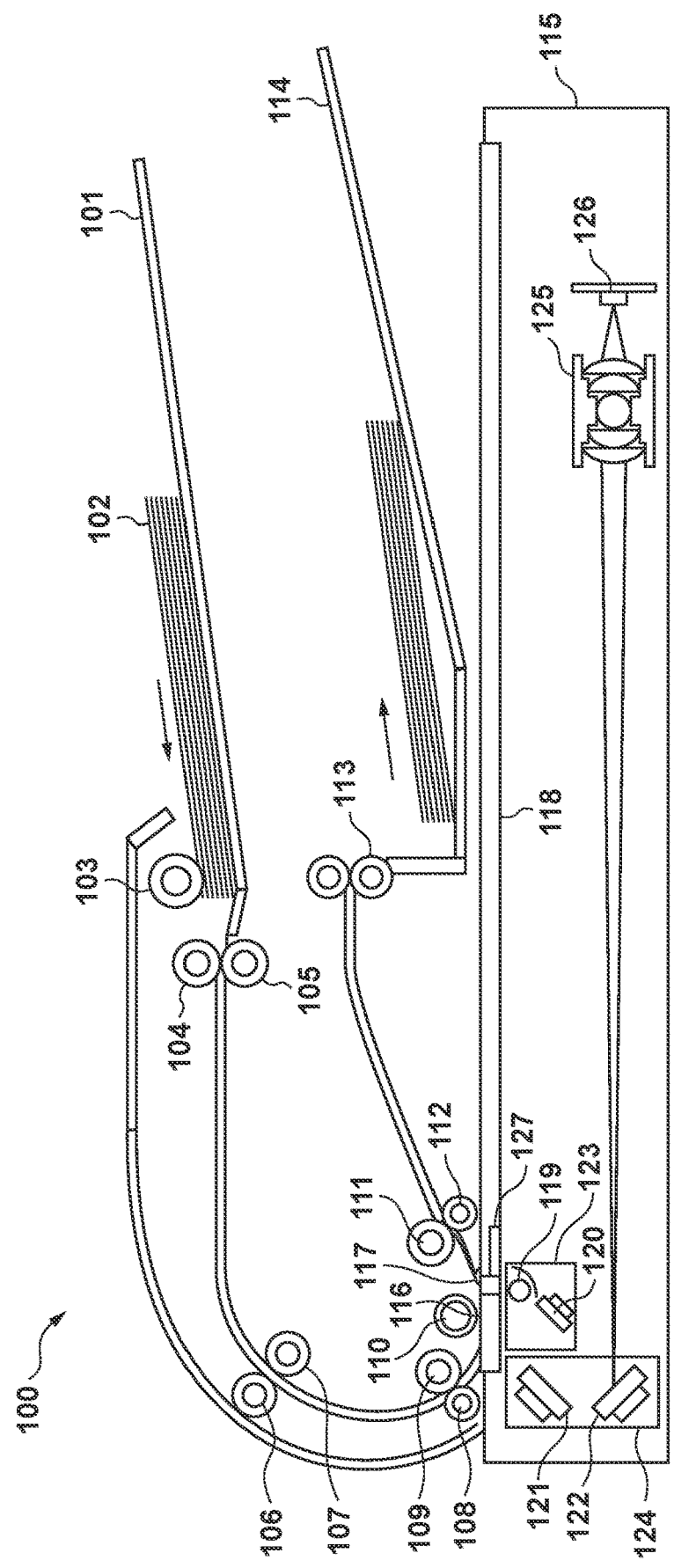
FIG. 1 is a schematic diagram illustrating an example of a configuration of an image reading unit according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

1. Basic Configuration Example

In this section, an example where the technology according to the present disclosure is applied to an image reading apparatus represented by a scanner device will be mainly described. The technology according to the present disclosure may be applied to a multi-function peripheral with an image reading function. Unless otherwise specified, each of constituent elements described below such as apparatuses, devices, modules, and chips may be composed of a single entity or a plurality of physically different entities.

FIG. 1 is a schematic diagram illustrating an example of a configuration of an image reading unit 100 according to an embodiment. Herein, as an example, the image reading unit 100 supports both of: a flow reading mode in which a sheet is read while being conveyed by an ADF; and a fixed reading mode in which a sheet set on a document platen is read.

An original 102 is set onto a document tray 101. The original 102 may be a bundle of a plurality of sheets. In this specification, each of such sheets, that is a physical page, is simply referred to as "page". For example, in a case where two logical pages of a plurality of logical pages of an electronic document are aggregated for printing into one sheet, the one sheet is called one page.

A feeding roller 103 is disposed above the leading end (left-hand side in the figure) of the document tray 101. The feeding roller 103 is axially supported by an arm (not shown) that is capable of swinging vertically. The feeding roller 103 retracts at a home position located above the tray surface in a standby state so that it does not interfere with the original set on the document tray 101. A pair of a separating and conveying roller 104 and a separating and conveying driven roller 105 (also referred to as separation unit) is disposed anteriorly in the conveyance direction from the feeding roller 103. The feeding roller 103 and the separating and conveying roller 104 are connected to the same driving source. Upon initiation of feeding operation, the feeding roller 103 moves downward to get in contact with the upper surface of the original 102 and is driven by the driving source to rotate to feed the original 102 to the separation unit. The separating and conveying driven roller 105 is formed of elastic material such as rubber material with slightly smaller friction than the separating and conveying roller 104 and is biased towards the separating and conveying roller 104. The separating and conveying driven roller 105 cooperates with the separating and conveying roller 104 to separate and convey each sheet of the original 102 fed by the feeding roller 103. A pair of a registration roller 106 and a registration driven roller 107 and a pair of a read roller 108 and a read driven roller 109 are disposed anteriorly in the conveyance direction from the separation unit. The registration roller 106 and the registration driven roller 107 lets the leading edge of an incoming conveyed sheet strike nip portions (not shown) of the respective resting rollers so as to loop the sheet to align the leading edge of the sheet. The read roller 108 and the read driven roller 109 convey a sheet provided from the registration rollers pair towards the flow-reading glass 116. A platen roller 110 is disposed at the opposing position of the flow-reading glass 116. light is emitted through the flow-reading glass 116 to a sheet passing over the flow-reading glass 116 and reflected light is read by a CCD line sensor 126, which will be described later. The sheet that has passed over the flow-reading glass 116 is scooped up by a jump stand 117 and conveyed by a pair of a read discharge roller 111 and a read discharge driven roller 112 towards discharge rollers 113. The discharge rollers 113 discharge an incoming conveyed sheet to a discharge tray 114.

An optical system 115 is disposed below the above-described conveyance system. The optical system 115 has a lamp 119 that emits light to a surface of a sheet, and a group of mirrors 120, 121, 122 that guide reflected light from the sheet to a lens 125 and the CCD line sensor 126. The lamp 119 and the mirror 120 are attached to a first mirror stand 123 and the mirrors 121, 122 are attached to a second mirror stand 124. The mirror stands 123, 124 are driven by a driving motor (not shown) via a wire (not shown) such that they are movable in parallel to a document platen glass 118. A reference white board 127 is attached at one end of the document platen glass 118 and is used as a reference of luminance reading. The reflected light from a sheet is guided via the mirrors 120, 121, 122 to the lens 125 and forms, via the lens 125, an image on a light receiving surface of the CCD line sensor 126. The CCD line sensor 126 performs photoelectric conversion on the imaged light by light receiving elements to output a read image signal which is an electrical signal. In the flow reading mode, an image of reflected light from a sheet passing over the flow-reading glass 116 is captured by the CCD line sensor 126 with the first mirror stand 123 and the second mirror stand 124 kept still. In the fixed reading mode, an image of reflected light from a sheet set on the document platen glass 118 is captured by the CCD line sensor 126 while the first mirror stand 123 and the second mirror stand 124 moves horizontally.

In the flow reading mode, the CCD line sensor 126 can only read reflected light from the downmost sheet on the flow-reading glass 116 when multiple sheets are conveyed in a state where the sheets overlap with each other (that is, in the case of double feed). In this case, some of pages that should be consecutive in the original 102 are not read and a missing page will occur in a sequence of read images. There is also a possibility that a page, which is in fact needed, is missing in the original 102 when it is set on the document tray by a user. In the fixed reading mode, there is also a possibility that, when flipping pages of an original on the document tray, a user erroneously skips a page. If a missing page occurs in a sequence of read images due to any of such reasons, inappropriate image data will be provided to a user. Therefore, an image reading apparatus 10 according to an embodiment determines whether there is a missing page in read images by utilizing a machine learning technology as described below.

Figure 2:
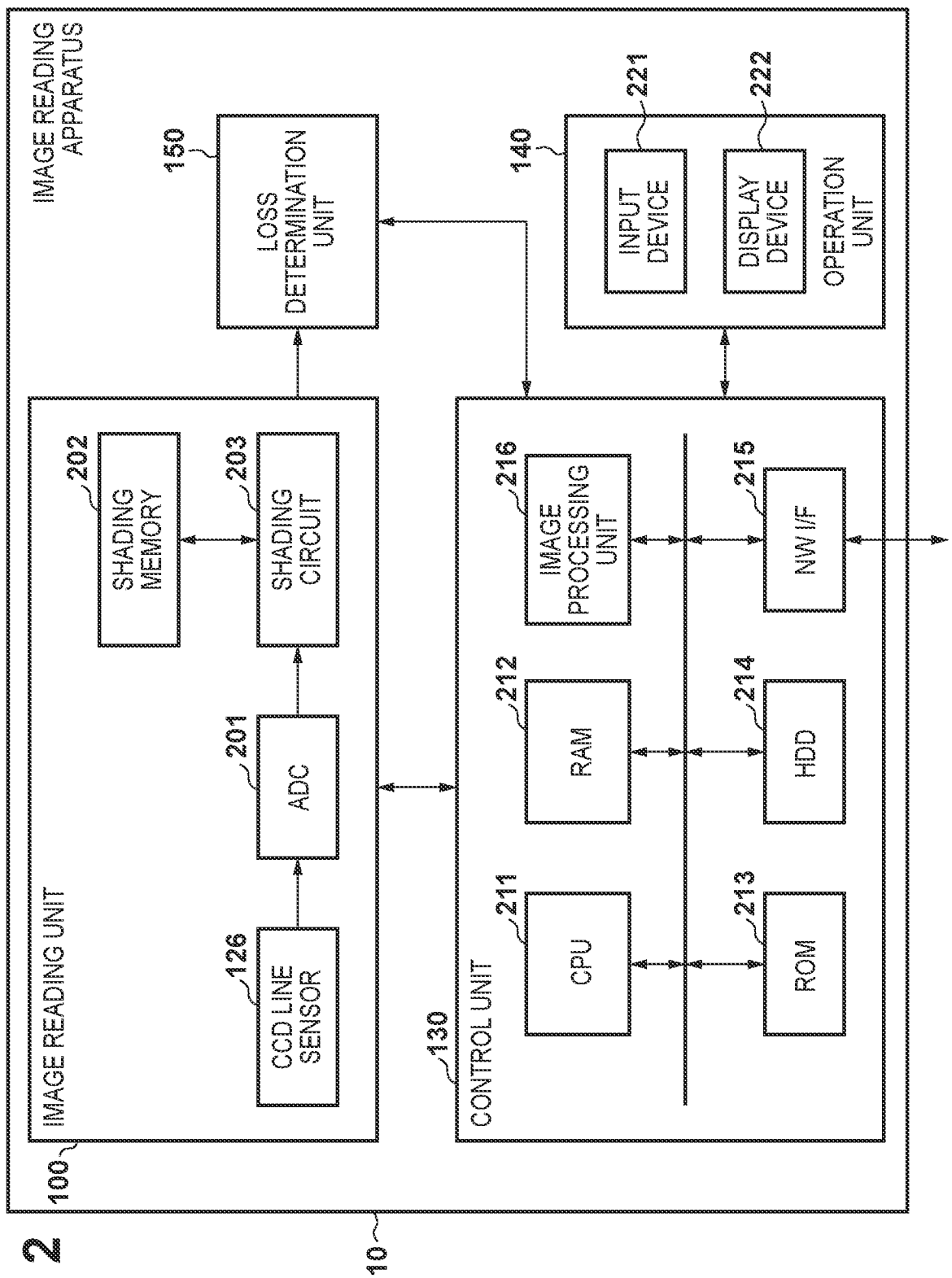
FIG. 2 is a block diagram illustrating an example of a functional configuration of an image reading apparatus having the image reading unit shown in FIG. 1.

FIG. 2 is a block diagram illustrating an example of a functional configuration of the image reading apparatus 10 having the image reading unit 100 shown in FIG. 1. With reference to FIG. 2, the image reading apparatus 10 includes the image reading unit 100, a control unit 130, an operation unit 140 and a loss determination unit 150.

The control unit 130 is a controller that controls overall operations of the image reading apparatus 10. More specifically, the control unit 130 includes a CPU 211, a RAM 212, a ROM 213, an HDD 214, a NW I/F 215 and an image processing unit 216. The CPU 211 is a processor that executes a computer program stored in a non-transitory computer-readable storage medium, for example the ROM 213 or the HDD 214, by loading it to the RAM 212. The CPU 211 outputs, to the image reading unit 100, driving signals to drive respective sections of the image reading unit 100 for reading an original, for example. In a learning stage, the CPU 211 causes the loss determination unit 150 to perform learning process for deriving a model for missing page determination. In a reading stage, the CPU 211 causes the loss determination unit 150 to determine whether there is a missing page in read images using the learned model derived through the prior learning. The RAM 212 is a so-called main memory and provides the CPU 211 with a temporary storage area. The ROM 213 is a non-volatile memory and stores some of programs executed by the CPU 211. The HDD 214 is a so-called auxiliary storage device and stores different programs, setting data, and image data. The network (NW) interface (I/F) 215 is an interface for communication by the image reading apparatus 10 with other apparatuses via a network. The NW I/F 215 may be a wired communication interface or may be a wireless communication interface. The image processing unit 216 is a processor that is dedicated for image processing and performs various image processing such as rotation, resizing, compression coding, and format conversion for read image data generated by the image reading unit 100.

The image reading unit 100 is a unit that sequentially reads respective pages of a target original consisting of a plurality of pages to generate read images of the respective pages. More specifically, the image reading unit 100 includes an ADC 201, a shading memory 202 and a shading circuit 203, in addition to the CCD line sensor 126 illustrated in FIG. 1. The CCD line sensor 126 generates read image signals, which are analogue electrical signals, in accordance with the driving signals from the CPU 211 to output the generated read image signals to the ADC 201. The analogue to digital convertor (ADC) 201 converts the read image signals in analogue form into read image data in digital form to output the read image data to the shading circuit 203. The shading memory 202 is a memory that stores in advance shading coefficients for correcting an effect due to unevenness of sensitivity in the CCD line sensor 126. The shading circuit 203 corrects the read image data in accordance with the shading coefficients stored in the shading memory 202. The read image data that has been generated in this way by the image reading unit 100 is output to the control unit 130 and the loss determination unit 150 per read page basis. The read image data output to the control unit 130 will be further processed by the image processing unit 216 and may be stored in the HDD 214 or transmitted to another apparatus via the NW I/F 215, for example.

The operation unit 140 is a unit for receiving a user operation towards the image reading apparatus 10 and presenting information to a user. More specifically, the operation unit 140 includes an input device 211 and a display device 222. The input device 221 includes, for example, one or more of a button, a switch and a touch sensor, and receives a user operation. The display device 222 may be, for example, a liquid crystal display (LCD) or an organic light emitting display (OLED), and displays an image and visual information onto a screen.

The loss determination unit 150 is a module for determining whether there is a missing page or not in a sequence of read images of an original, that have been generated by the image reading unit 100. In FIG. 2, for the purpose of illustration, the loss determination unit 150 is illustrated as a separate module from the image reading unit 100 and the control unit 130. However, some or all of the functions of the loss determination unit 150 described below may be implemented as a software module executed by the CPU 211, for example. Moreover, a digital signal processing in the image reading unit 100 (for example, the shading) together with the processing in the loss determination unit 150 may be implemented with a dedicated processing circuit (for example, ASIC). In the present embodiment, the loss determination unit 150 determines whether there is a missing page or not in the read images by utilizing a machine learning technology as mentioned above. In the first embodiment example described in the next section, the loss determination unit 150 determines whether or not there is a missing page in a pair of read images generated consecutively for a target original, on the basis of a probability calculated utilizing a machine learning technology. In the second embodiment example described in the section after the next, the loss determination unit 150 utilizes a machine learning technology to detect values of consecutive number elements described in respective read images, and determines whether there is a missing page or not on the basis of relationship between the detected values. In any case, information other than page numbers included in an original will be taken into consideration in the determination, and it becomes possible to determine whether there is a missing page or not with a good accuracy for various originals.

2. First Embodiment Example

FIG. 3 is a block diagram illustrating an example of a detailed configuration according to the first embodiment example of the loss determination unit 150 shown in FIG. 2. With reference to FIG. 3, the loss determination unit 150 includes a preprocessing unit 301, a data memory 302, a learning unit 303, a model storage unit 304, and a determination unit 305.

The preprocessing unit 301 performs preprocessing (also referred to as encoding process) for generating input data to be input to a learning process or determination data to be applied to a learned model based on respective read images input from the image reading unit 100. The input data and determination data typically include a set of character objects for each read image. For example, the preprocessing unit 301 can recognize characters in each image utilizing any of publicly-known optical character recognition (OCR) technologies. Each character object may include, for example: in-page coordinates data indicating a position in a page at which each character is recognized; character code data identifying each character; and character attribute data indicating visual attributes of each character. The visual attributes of each character may include one or more of font type, character size and color, for example. The input data and determination data may further include a set of image objects for each read image. The image object corresponds to an image element that is not a character included in the read image, and may include: in-page coordinates data indicating a position of the image element in a page; and vector data generated by encoding the image. The preprocessing unit 301 stores, in the data memory 302, a data set including a set of character objects and a set of image objects generated for each read image as input data and determination data based on each read image. In the learning process described below, two data sets based on a pair of two read images will be treated as a unit of input data for learning. Similarly, in a missing page determination, the data sets for a pair of two consecutively-generated read images, that is, a pair of read images input from the image reading unit 100 one after another will be applied to a learned model as a unit of determination data.

The data memory 302 stores the data set for each read image generated by the preprocessing unit 301 in association with identification information that identifies the corresponding read image (for example, a sequence number).

The learning unit 303 performs a supervised learning process for deriving, through machine learning, a learned model to determine whether there is a missing page in read images of an original. In the following, an example where a regression algorithm employing a neural network (including deep learning using a neural network with multiple layers) is utilized as a learning algorithm will be mainly described. However, the present embodiment example is also applicable to a two-class classification learning algorithm such as support vector machine and decision tree. The input data for the learning process is the one generated by the preprocessing unit 301 based on image pairs of consecutive pages of an original for learning and image pairs of non-consecutive pages of the original for learning. The training data for the learning process is data that correctly indicates whether each image pair is a pair of consecutive pages or not.

FIG. 4 is an explanatory diagram for describing a learning mechanism according to the present embodiment example. In FIG. 4, an exemplary neural network model consisting of an input layer, three intermediate layers and an output layer is illustrated. The input layer consists of a plurality of nodes that correspond to data elements of two data sets 412, 422 based on two read images 411, 421. Each of the intermediate layers also has a plurality of nodes, and model parameters such as a weight and a bias are assigned to each of the nodes. The model parameters are used in operation to propagate a value between layers. For example, a value from the node b1 of the second intermediate layer may be calculated as the following equation:

$$b1 = \alpha \times a1 + \beta \times a2 + \gamma \times a3 + \ldots$$

where $\alpha$, $\beta$ and $\gamma$ denote the weights. Biases are omitted in the equation. It should be noted that the above equation represents a linear combination, but a non-linear operation may be performed in practice. In accordance with such model parameters temporarily assigned to respective nodes, values from nodes constituting the output layer may be calculated from a set of input data. In the example in FIG. 4, the output layer consists of two nodes, one of which represents an estimation probability Y1 for "no page is missing", and the other represents an estimation probability Y2 for "a page is missing". The estimation probabilities Y1, Y2 take a value in the range of zero to one. In the learning process, many pairs of read images 411, 421 are prepared along with knowledge of whether each of them involves a missing page or not, and the estimation probabilities from the output layer are sequentially calculated per pair basis. The training data indicates whether there is a missing page or not, and a pair with a missing page should give Y1=0.0, Y2=1.0 whereas a pair without a missing page should give Y1=1.0, Y2=0.0. Once the estimation probabilities have been calculated for one pair, the model parameters are adjusted such that a loss L of those estimation probabilities with respect to the correct values is minimized. The loss L may be calculated in accordance with a loss function as follows, for example:

$$L = 1 - Y1 \text{ (in the case of input data without a missing page)}$$

$$L = 1 - Y2 \text{ (in the case of input data with a missing page)}$$

The learning unit 303 iterates such calculation of estimation probabilities and adjustment of model parameters for each of the many pairs of read images until it is determined that the learning has sufficiently converged (or until the number of iterations reaches an upper limit value). After the learning process ends, the learning unit 303 stores the learned model, that is, the set of the model parameters in the model storage unit 304.

Figures 5A, 5B, 5C:
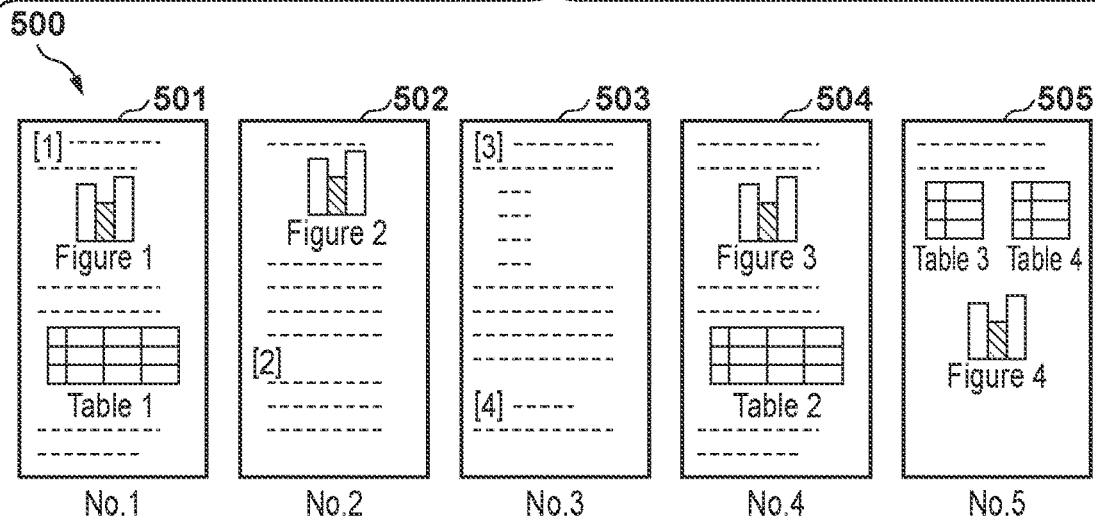
FIGS. 5A to 5C are explanatory diagrams for describing an example of data for learning that may be used in the first embodiment example.

FIGS. 5A to 5C are explanatory diagrams for describing an example of data for learning that may be used in the present embodiment example. The original for learning 500 illustrated in FIG. 5A consists of a plurality of pages, and it is ensured that there is no missing page in read images 501, 502, 503, 504, 505, ... generated by reading the original for learning 500. The table 510 illustrated in FIG. 5B is a list of pairs of consecutive pages from the original for learning 500, which indicates expected values of estimation probabilities (that is, training data) for each pair. All of the pairs listed in the table 510 do not include a missing page, and thus the expected values of the estimation probabilities Y1 and Y2 for them are set to 1.0 and 0.0. The table 520 illustrated in FIG. 5C is a list of pairs of non-consecutive pages from the original for learning 500, which indicates expected values of estimation probabilities (that is, training data) for each pair. The expected values of the estimation probabilities Y1 and Y2 for them are set to 0.0 and 1.0 for all of the pairs listed in the table 520. By sequentially picking out image pairs of consecutive pages and image pairs of non-consecutive pages from a sequence of read images which is known to involve no missing page, it is possible to carry out the learning process efficiently without a need to artificially generate a missing page.

It should be noted that the original may be read in any of ascending order of pages and descending order of pages. Hence, it is beneficial to use the same pair of read images two times as inputs to the learning process by reversing the input order, for the sake of handling uncertainty in the order of reading. In the example of FIG. 5B, the pairs with the D of '1-1' and '1-5' and the pairs with the IDs of '1-2' and '1-6' listed in the table 510 correspond to the same image pairs only with the exception of their order.

One can also assume that a pair of read images having nearer page numbers within the same original have more closely similar contents and are likely to be erroneously determined that there is no missing page even when they include a missing page. Hence, by prioritizing pairs of non-consecutive ones with nearer page numbers within the same original over other pairs to use in the learning process, the accuracy of the learned model can be efficiently improved. Additionally, when a both-side-printed sheet is lost, two logical pages will be missing at a time, though a missing page usually occurs as a loss of one sheet. Hence, it may be contemplated to use, in the learning process, not only image pairs in which only a single logical page is missing in between but also image pairs in which two logical pages are missing in between. In the example of FIG. 5C, the table 520 lists, as pairs that may be used with high priorities, three pairs of images in which only a single logical page is missing in between (with pair IDs of '2-1', '2-2' and '2-3') and two pairs of images in which two logical pages are missing in between (with pair IDs of '3-1', '3-2').

It should be noted that the way to prepare data for learning is not limited to the above-described examples. That is, any pair of two read images extracted from an original for learning consisting of a plurality of pages may be used in the learning process. Additionally, pairs of read images extracted from two different originals for learning may be used in the learning process.

The model storage unit 304 stores the set of model parameter values of the learned model derived by the learning unit 303. It should be noted that, in a case where the learned model is realized as a dedicated logical circuit, the derived values of the model parameters may be implemented to the logical circuit representing the learned model.

The determination unit 305 determines whether there is a missing page in the read images of the target original by applying, to the learned model stored in the model storage unit 304, determination data based on a pair of consecutively-generated read images of the target original. For example, the determination unit 305 reads out, from the data memory 302, the determination data generated by the pre-processing unit 301 for a pair of consecutive images from the read images sequentially generated by the image reading unit 100. The determination unit 305 then calculates the above-described estimation probabilities Y1 and Y2 by applying the read determination data to the neural network model as described using FIG. 4. The determination unit 305 compares the calculated estimation probability Y1 or Y2 with a predetermined determination threshold. If the estimation probability Y1 is below the determination threshold (or the estimation probability Y2 is above another determination threshold), the determination unit 305 may determine that there is a missing page in the pair of read images. On the other hand, if the estimation probability Y1 is above the determination threshold (or the estimation probability Y2 is below such another determination threshold), the determination unit 305 may determine that there is no missing page in the pair of read images. The determination unit 305 outputs the result of such determination to the control unit 130.

The determination unit 305 iterates the above determination until it reaches the last read image generated for the target original. In a case where it is determined by the determination unit 305 that there is no missing page in all of the image pairs, the reading of the target original ends normally. On the other hand, in a case where it is determined by the determination unit 305 that there is a missing page in the read images of the target original, the control unit 130 causes the image reading unit 100 to suspend reading of subsequent pages. In this case, the control unit 130 may notify a user that a missing page has occurred. The notification to a user may be performed by displaying a message on a screen of the display device 222, or may be performed by transmitting a message to a specific account via the NW I/F 215.

FIG. 6 is an explanatory diagram illustrating an example of a graphical user interface (GUI) that may be displayed on a screen when it is determined that there is a missing page. The GUI 600 illustrated in FIG. 6 includes a preview 601 of the read image immediately preceding the determined missing page, and a preview 602 immediately succeeding the determined missing page, along with a message notifying that a missing page has occurred. The GUI 600 further includes a stop reading button 611 and a continue button 612. A user who checked the previews 601, 602 can instruct the image reading apparatus 10 to stop reading the subsequent pages by selecting (for example, tapping) the stop reading button 611 if he or she judges that the missing page has really occurred, if the user who checked the previews 601, 602 judges that the detection of the missing page is incorrect, he or she can instruct the image reading apparatus 10 to continue to read the subsequent pages by selecting the continue button 612. In this manner, by making an inquiry to a user whether to continue reading subsequent pages or not along with the previews when a missing page is detected, it will be possible for a user to avoid inconvenience that reading operation which actually should not be stopped is stopped due to incorrectness of the determination.

The selection of the continue button 612 of the GUI 600 may be interpreted as a user input indicating that the determination of a missing page that triggered the notification by the GUI 600 was incorrect. Thus, in response to the continue button 612 being selected, the control unit 130 may cause the learning unit 303 to additionally perform the learning process using, as an input data, the determination data based on the pair of read images corresponding to the incorrect determination (the pair of images shown by the previews 601, 602). The training data in this case indicates that there is no missing page. After the additional learning is performed, the learned model stored in the model storage unit 304 may be updated.

FIG. 7 is an explanatory diagram illustrating an example of a GUI that may be displayed on a screen when re-executing reading after detecting a missing page. The GUI 700 illustrated in FIG. 7 may be displayed on the screen of the display device 222 upon selection by the user of the stop reading button 611 in the GUI 600 of FIG. 6, for example. The GUI 700 includes a message that prompts a user to set, onto the ADF, an original supplemented with a subsequent page, along with a preview 701 of the read image immediately preceding the detected missing page (substantially the same as the preview 601 of the GUI 600). The GUI 700 further includes a cancel button 711 and a start button 712. The user can cause the image reading apparatus 10 to read again the target original in a state where there is no longer a missing page by adding the lost page of the target original subsequent to the page recognized from the preview 701 to the original, setting the original onto the ADF, and selecting the start button 712. The user may, of course, select the cancel button 711 to cancel reading for a reason that the missing page is unavailable, for example.

Figure 8:
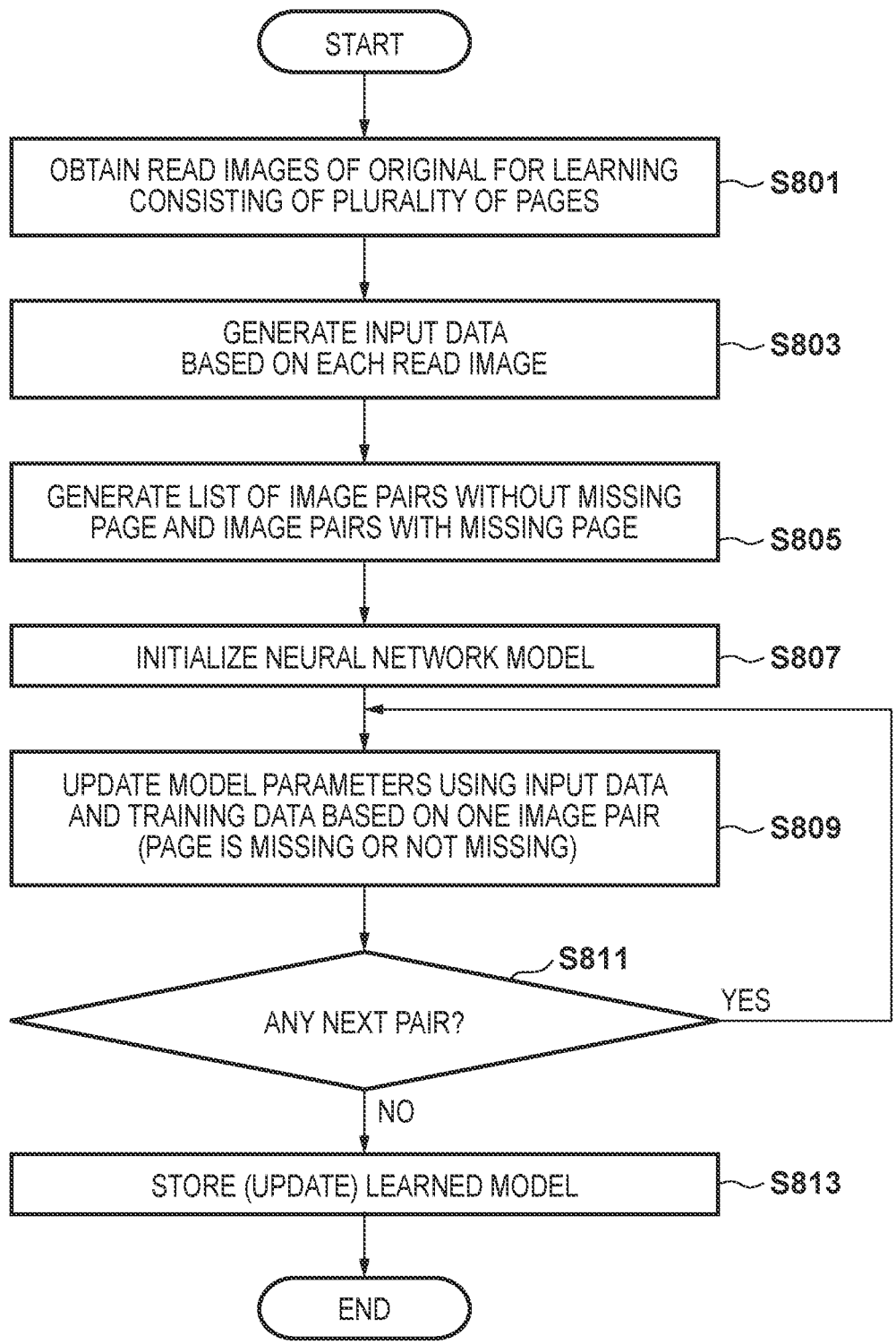
FIG. 8 is a flowchart illustrating an example of a flow of a process in learning stage according to the first example embodiment.

FIG. 8 is a flowchart illustrating an example of a flow of a process in learning stage according to the present example embodiment. The process illustrated in FIG. 8 is performed under control of the CPU 211 that executes a computer program loaded to the RAM 212, unless otherwise stated. Note that 'S (Step)' in the following descriptions is an abbreviation of 'process step'.

First, at S801, the preprocessing unit 301 obtains read images of one or more originals for learning, each of which consists of a plurality of pages. It is ensured that the read images obtained here do not involve a missing page. The read images of the originals for learning may be generated by the image reading unit 100 or may be generated in advance by another apparatus prior to the learning process.

Next, at S803, the preprocessing unit 301 generates input data based on each of the obtained read images. For example, the preprocessing unit 301 generates, for each read image, a data set that includes a set of character objects of characters recognized in the image, and a set of image objects. The preprocessing unit 301 stores the generated input data in the data memory 302.

Next, at S805, the control unit 130 generates a list of image pairs to be used in the learning process. The list of image pairs includes pairs of images of consecutive pages of an original for learning, and those image pairs are associated with training data indicating that there is no missing page. The list of image pairs further includes pairs of images of non-consecutive pages of an original for learning, and those image pairs are associated with training data indicating that there is a missing page.

Next, at S807, the learning unit 303 initializes a neural network model. It should be noted that, in a case where an existing learned model is updated, model parameters of the existing learned model may be deployed to the neural network model at this point.

Next, at S809, the learning unit 303 updates model parameters using the input data and the training data (a page is missing or not missing) based on one image pair in the list generated at S805. This action may be iterated until it is determined at S81 that there remains no next image pair in the list, for example.

After the iterations at S809 completed, the learning unit 303 stores, at S813, the learned model derived through the iterations in the model storage unit 304 (or updates the model parameters stored in the model storage unit 304).

Figure 9:
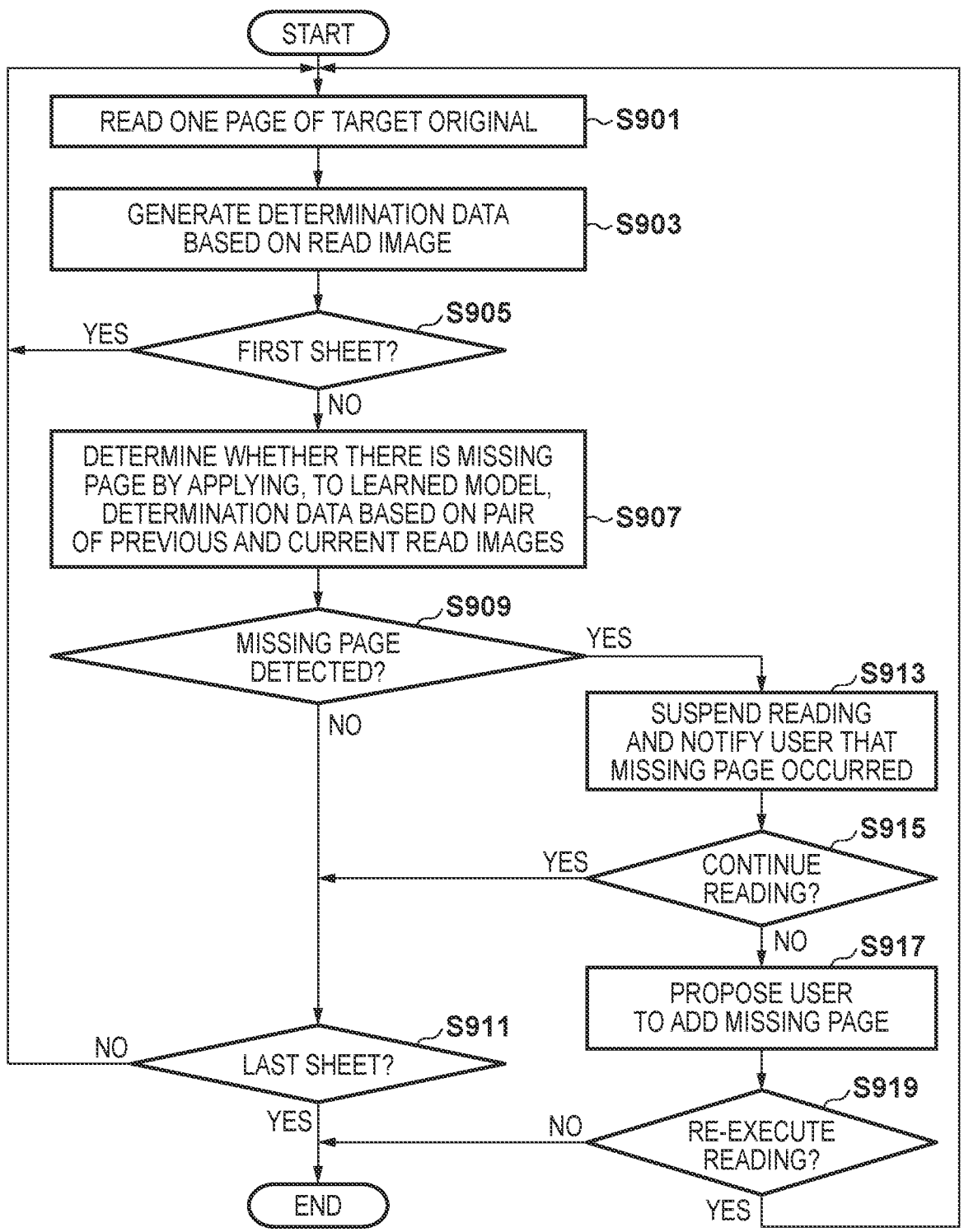
FIG. 9 is a flowchart illustrating an example of a flow of a process in reading stage according to the first example embodiment.

FIG. 9 is a flowchart illustrating an example of a flow of a process in reading stage according to the present example embodiment. The process illustrated in FIG. 9 is performed under control of the CPU 211 that executes a computer program loaded to the RAM 212, unless otherwise stated.

First, at S901, the image reading unit 100 performs reading of one page of a target original to generate a read image. The read image is output from the image reading unit 100 to the control unit 130 and the loss determination unit 150.

Next, at S903, the preprocessing unit 301 of the loss determination unit 150 generates determination data based on the read image input from the image reading unit 100. For example, the preprocessing unit 301 generates a data set that includes a set of character objects of characters recognized in the read image and a set of image objects. The preprocessing unit 301 stores the generated determination data in the data memory 302.

In a case where the read sheet is the first sheet in the target original, S901 and S903 above are iterated once again (S905) to generate determination data based on the read image of the second sheet.

Next, at S907, the determination unit 305 determines whether there is a missing page between the previous and current sheets by applying the determination data based on the pair of previous and current read images to the learned model stored in the model storage unit 304. For example, the determination unit 305 may determine that there is a missing page in the pair of read images in a case where the estimation probability that a page is missing output from the learned model is above a determination threshold. The subsequent process branches at S909 depending on whether or not it is determined that there is a missing page.

In a case where it is determined that there is no missing page, the process further branches at S911 depending on whether the current sheet is the last sheet of the target original. If the current sheet is not the last sheet, reading, generation of determination data and determination about a missing page are performed for the next sheet. If the current sheet is the last sheet, the process ends. It should be noted that the control unit 130 can determine whether the current sheet is the last sheet based on an input from a sensor that detects presence of a sheet on the document tray 101, for example.

In a case where it is determined at S907 that there is a missing page, the control unit 130 causes the image reading unit 100 to suspend the reading operation at S913, and notifies a user via the operation unit 140 that the missing page has occurred. For example, the GUI 600 illustrated in FIG. 6 is displayed on the screen of the display device 222.

The subsequent process branches at S915 depending on a user input regarding whether or not to continue the reading operation. In a case where the user selects to continue the reading operation (for example, in a case where the continue button 612 is selected in the GUI 600), the process proceeds to S911. On the other hand, in a case where the user selects to stop the reading operation (for example, in a case where the stop reading button 611 is selected in the GUI 600), the process proceeds to S917.

At S917, the control unit 130 makes an inquiry to the user via the operation unit 140 whether or not to re-execute the reading operation or not. In this inquiry, the control unit 130 proposes the user to add the lost page to the original. For example, the control unit 130 displays the GUI 700 illustrated in FIG. 700 on the screen of the display device 222.

The subsequent process branches at S919 depending on a user input regarding whether or not to re-execute the reading operation. In a case where the user selects not to re-execute the reading operation (for example, in a case where the cancel button 711 is selected in the GUI 700), the process ends. On the other hand, in a case where the user selects to re-execute the reading operation (for example, in a case where the start button 712 is selected in the GUI 700), the process goes back to S901, and the above-described process is performed again for the target original (with the lost page added).

As above, the first embodiment example has been described in detail using FIGS. 3 to 9. According to the present embodiment example, a learned model to determine whether there is a missing page in read images of a target original consisting of a plurality of pages is derived through machine learning using read images of an original for learning. The machine learning is performed using: input data based on image pairs of consecutive pages of the original for learning and image pairs of non-consecutive pages of the original for learning; and training data that indicates whether each image pair is a pair of consecutive pages. Then, it is determined whether there is a missing page in the read images of the target original by applying, to the derived learned model, determination data based on a pair of consecutive read images of the target original. According to such a configuration, it will be possible to perform missing page determination with a good accuracy without necessarily relying on page numbers because correlations between information other than page numbers included in an original and presence or absence of a missing page are learned.

Further, according to the present embodiment example, the determination data includes a set of character objects for each of a first read image and a second read image constituting the read image pair, and each character object includes in-page coordinates data, character code data and character attribute data. According to such a configuration, it will be possible to acquire a learned model that can determine whether there is a missing page or not by using, as a clue, positional relationship and numerical relationship between number elements having characteristic character attributes such as chapter numbers, figure numbers, table numbers or mathematical expression numbers. The determination data may further includes a set of image objects, and each image object includes in-page coordinates data and vector data. This will allow for acquiring a learned model that can determine whether there is a missing page or not by also using, as a clue, positional relationship between image elements, such as figures and tables, and the above-described number elements.

3. Second Embodiment Example

Figure 10:
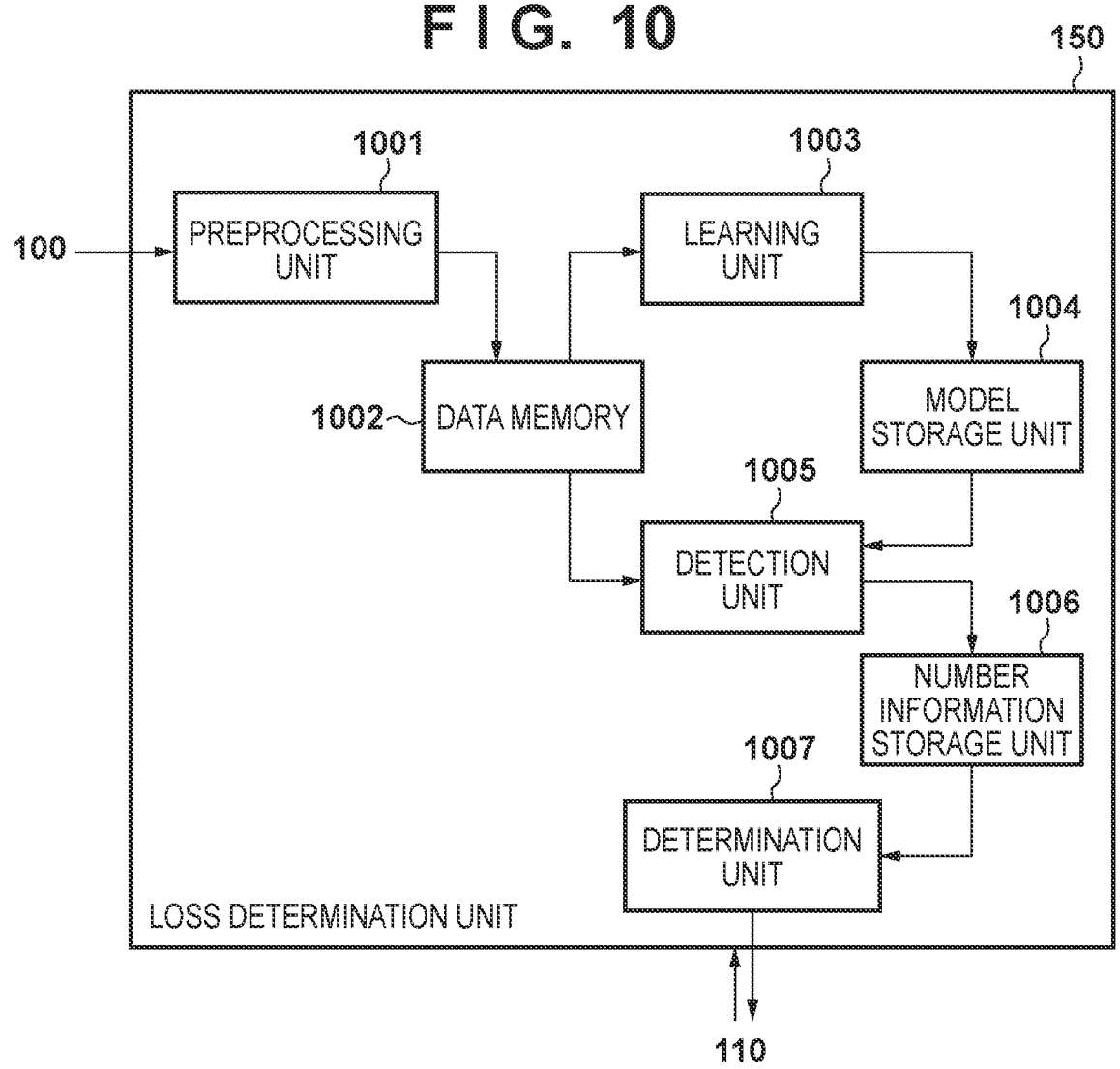
FIG. 10 is a block diagram illustrating an example of a detailed configuration according to a second embodiment example of a loss determination unit shown in FIG. 2.

FIG. 10 is a block diagram illustrating an example of a detailed configuration according to the second embodiment example of the loss determination unit 150 shown in FIG. 2. With reference to FIG. 10, the loss determination unit 150 includes a preprocessing unit 1001, a data memory 1002, a learning unit 1003, a model storage unit 1004, a detection unit 1005, a number information storage unit 1006, and a determination unit 1007.

Similarly to the preprocessing unit 301 according to the first embodiment example, the preprocessing unit 1001 performs preprocessing for generating input data to be input to a learning process or detection data to be applied to a learned model based on respective read images input from the image reading unit 100. In the present embodiment example as well, the input data and detection data include a set of character objects for each read image. Each character object may include, for example: in-page coordinates data indicating a position in a page at which each character is recognized; character code data identifying each character; and character attribute data indicating visual attributes of each character. The visual attributes of each character may include one or more of font type, character size and color, for example. The input data and detection data may further include a set of image objects for each read image. The image object corresponds to an image element that is not a character included in the read image, and may include: in-page coordinates data indicating a position of the image element in a page; and vector data generated by encoding the image. The preprocessing unit 1001 stores, in the data memory 1002, a data set including a set of character objects and a set of image objects generated for each read image as input data and detection data based on each read image.

The data memory 1002 stores the data set for each read image generated by the preprocessing unit 1001 in association with identification information that identifies the corresponding read image.

The learning unit 1003 performs a supervised learning process for deriving, through machine learning, a learned model to detect values of consecutive number elements described in each page of an original. The consecutive number elements herein means text elements within an original that are given consecutive (or sequential) numbers throughout the original. The input data for the learning process is the above-described data generated by the preprocessing unit 1001 based on a read image of each page of an original for learning. The training data for the learning process is data that correctly indicates values of consecutive number elements described in each page of the original for learning. In the present embodiment example, the consecutive number elements include at least one type of non-page number elements. The non-page number elements may be one or more of the followings, for example:

Chapter number elements e.g. "Chapter 1", "1. XXX"
Figure number elements e.g. "FIG. 1", "FIG. 1"
Table number elements e.g. "Tab. 1", "Table 1"
Mathematical expression number elements e.g. "Equation 1", "Exp. 1"

Detecting such values of non-page number elements and using them for determination will allow missing page determination to be done without necessarily relying on page numbers. In addition, detecting values of page number elements together with such values of non-page number elements and using them will allow for more robust missing page determination.

Figure 11:
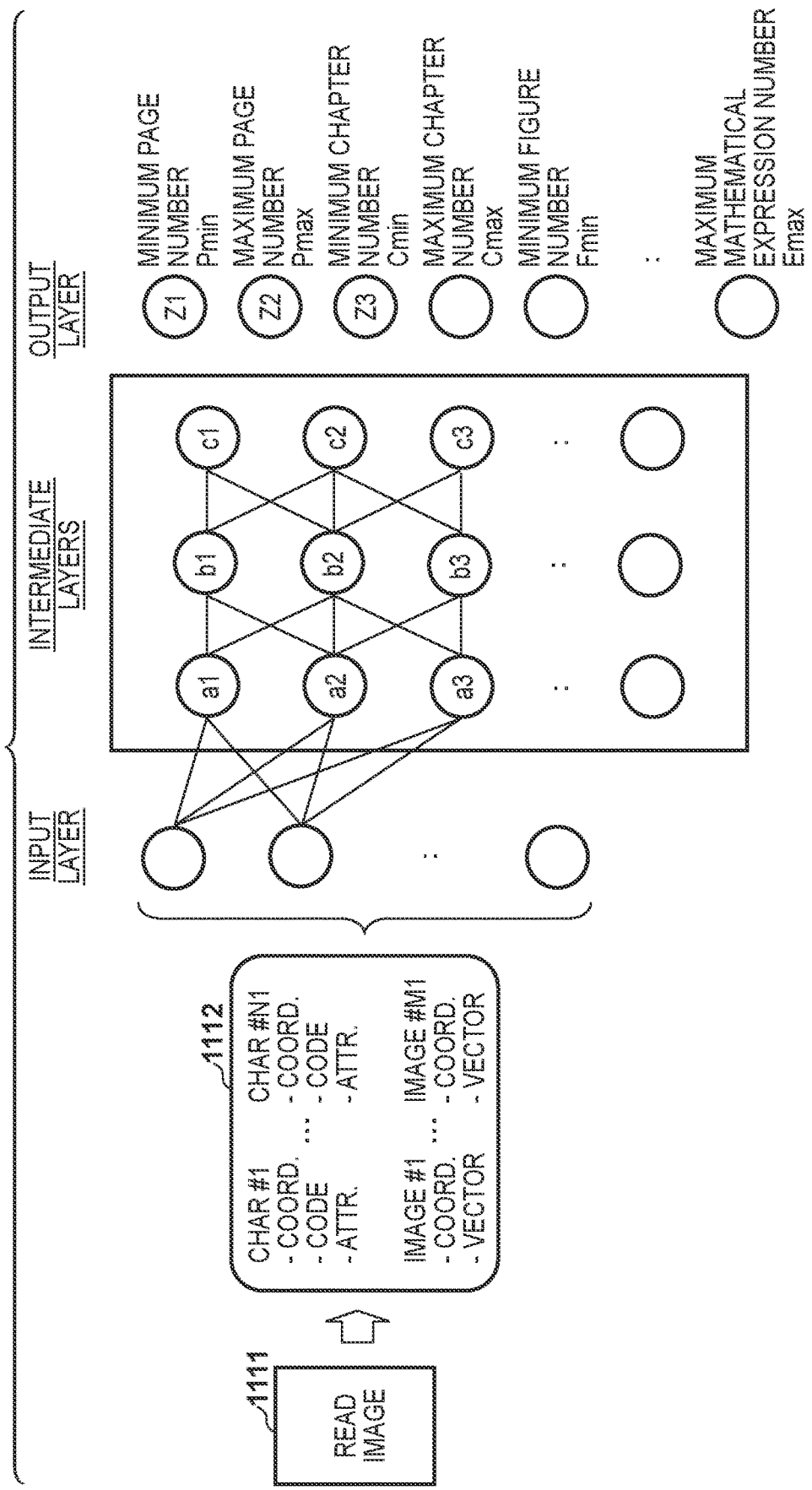
FIG. 11 is an explanatory diagram for describing a learning mechanism according to the second embodiment example.

FIG. 11 is an explanatory diagram for describing a learning mechanism according to the present embodiment example. In FIG. 11, an exemplary neural network model consisting of an input layer, three intermediate layers and an output layer is illustrated similarly to FIG. 4. The input layer consists of a plurality of nodes that correspond to data elements of a data set 1112 based on a read image 1111. The output layer, as an example, consists of nodes that correspond to the minimum and maximum values within each read image for respective types of consecutive number elements. For example, the output layer may include the following ten nodes:

Minimum page number $P_{min}$
Maximum page number $P_{max}$
Minimum chapter number $C_{min}$
Maximum chapter number $C_{max}$
Minimum figure number $F_{min}$
Maximum figure number $F_{max}$
Minimum table number $T_{min}$
Maximum table number $T_{max}$
Minimum expression number $E_{min}$
Maximum expression number $E_{max}$ For example, the minimum and maximum page numbers respectively mean the smallest and largest ones of the logical page number(s) described in one read image. In a case where two logical pages are aggregated for printing into one sheet, the minimum and maximum page numbers may indicate different values from each other. The minimum and maximum chapter numbers respectively mean the smallest and largest ones of the chapter number(s) described in one read image. The same applies to the other consecutive number elements. It should be noted that the chapter as used herein may include any unit that represents ordering in documentary structure such as a section, an item and a paragraph. The output value from each node of the output layer is either of "none" or any possible number value (for example, an integer). For example, both of the minimum and maximum chapter numbers $C_{min}$ and $C_{max}$ for a read image that includes no chapter number at all will be "none".

In the learning process, many read images are prepared along with knowledge of the minimum and maximum values of consecutive number elements within each image, and the output values from the output layer are sequentially calculated per read image basis. The loss L in the present embodiment example may be calculated based on weighted average over Boolean values B(X), each of which indicates whether or not each output value X from the output layer fits the corresponding expected value indicated by the training data, as shown in the following expression. Note that B(X) equals 1 in a case where the output value X fits the expected value and, otherwise, B(X) equals 0:

$$L = 1 - (k_1 \times B(P_{min}) + k_2 \times B(P_{max}) + $$
$$k_3 \times B(C_{min}) + k_4 \times B(C_{max}) + k_5 \times B(F_{min}) + k_6 \times B(F_{max}) + $$
$$k_7 \times B(T_{min}) + k_8 \times B(T_{max}) + k_9 \times B(E_{min}) + k_{10} \times B(E_{max}))$$

where $k_1, k_2, \ldots, k_{10}$ are weighting coefficients for the weighted average which satisfy $k_1+k_2+\ldots+k_{10}=1$. In order to put higher preference on detection accuracy for page number values, the weighting coefficients may be set unevenly, for example, as $k_1=k_2=0.2$ and $k_3=k_4=\ldots=k_{10}=0.075$.

The learning unit 1003 iterates calculation of output values, calculation of the loss, and adjustment of model parameters for minimizing the loss for each of many read images in accordance with such model. After the learning process ends, the learning unit 1003 stores the learned model, that is, the set of model parameters in the model storage unit 1004.

Figure 12:
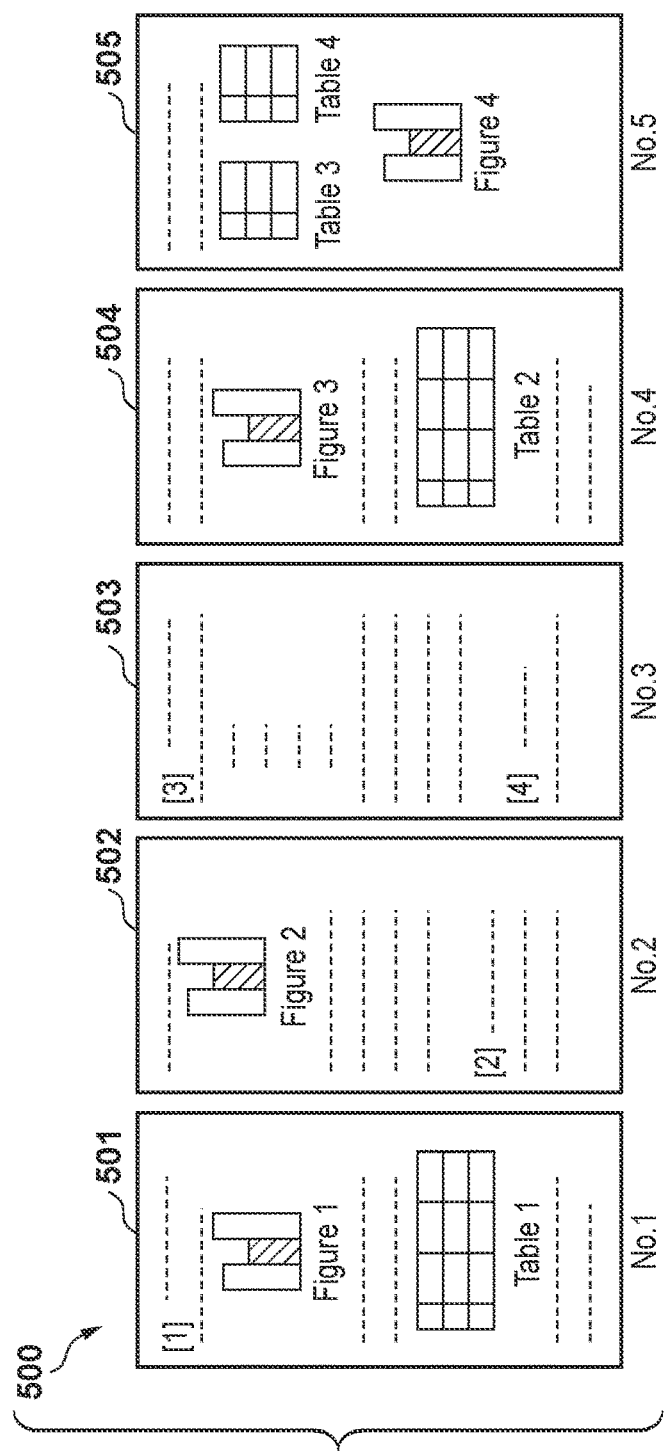
FIGS. 12A and 12B are explanatory diagrams for describing an example of data for learning that may be used in the second embodiment example.

FIGS. 12A and 12B are explanatory diagrams for describing an example of data for learning that may be used in the present embodiment example. The original for learning 500 that is identical to the one shown in FIG. 5A is illustrated again in FIG. 12A. The table 1210 illustrated in FIG. 12B is a list of known minimum and maximum values (that is, expected values) of respective types of consecutive number elements described in each of the read images 501, 502, 503, 504, 505, ... of the original for learning 500. For example, $P_{min}=P_{max}=C_{min}=C_{max}=F_{min}=F_{max}=T_{min}=T_{max}=1$ and $E_{min}=E_{max}=$"-(none)" for the read image 501. $P_{min}=P_{max}=C_{min}=C_{max}=F_{min}=F_{max}=2$ and $T_{min}=T_{max}=E_{min}=E_{max}=$"-(none)" for the read image 502. The learning unit 1003 uses such a set of expected values as training data to perform the above-described learning process. It should be noted that the data for learning may partially include input data based on a read image that contains no consecutive number element at all. However, since it is assumed that accurate detection of values of the consecutive number elements will be more difficult when there are a larger number of the consecutive number elements in an image, the accuracy of the teamed model can be advantageously enhanced by using data for learning based on read images, many of which include one or more consecutive number elements.

The model storage unit 1004 stores the set of model parameter values of the learned model derived by the learning unit 1003. It should be noted in the present embodiment example as well that, in a case where the learned model is realized as a dedicated logical circuit, the derived values of the model parameters may be implemented to the logical circuit representing the learned model.

The detection unit 1005 detects values of consecutive number elements described in each read image by applying, to the learned model stored in the model storage unit 1004, detection data based on each read image of the target original. For example, the detection unit 1005 reads out, from the data memory 1002, the detection data generated by the preprocessing unit 1001 for each of read images generated by the image reading unit 100. The detection unit 1005 then detects the minimum and maximum values, within each page, of consecutive number elements described in each read image by applying the read detection data to the neural network model as described using FIG. 11. In the present embodiment, the detection unit 1005 may detect the minimum and maximum values described in each read image for each type of page number element and non-page number elements. The detection unit 1005 stores the detected minimum and maximum values for each type of consecutive number elements in the number information storage unit 1006.

The number information storage unit 1006 stores the minimum and maximum values for each type of consecutive number elements detected for each read image by the detection unit 1005 in association with identification information that identifies the corresponding read image.

The determination unit 1007 determines whether or not there is a missing page between a first and second read images of the target original based on relationship between a value of a consecutive number element detected for the first read image and a value of the consecutive number element detected for the second read image. For example, the determination unit 1007 may determine that there is a missing page between the read images in a case where there is a missing number between the maximum value of a type of consecutive number element detected in the first read image and the minimum value of the same type of consecutive number element detected in the second read image which should be the subsequent page. Similarly, the determination unit 1007 may determine that there is a missing page between the read images in a case where there is a missing number between the minimum value of a type of consecutive number element detected in the first read image and the maximum value of the same type of consecutive number element detected in the second read image which should be the preceding page.

The determination unit 1007 may prioritize determination based on values of page number elements over determination based on values of non-page number elements. In this case, in a case where the determination unit 1007 cannot determine whether there is a missing page based on relationship of the minimum value $P_{min}$ and the maximum value $P_{max}$ detected for page number elements between images, the determination unit 1007 may determine whether there is a missing page based on a minimum value and a maximum value detected for non-page number elements.

For example, in a case where the maximum page number $P_{max}$ of the first read image of a target original read in ascending order of page numbers equals an integer n, the minimum page number $P_{min}$ of the second read image generated subsequently to the first read image would equal n+1. Hence, in this case, the determination unit 1007 may determine that there is a missing page between the first and second read images if the minimum page number $P_{min}$ of the second read image is larger than n+1. For a target original read in descending order of page numbers, a reversed relationship may be applied.

As a further example, in a case where the maximum chapter number $C_{max}$ of the third read image of the target original read in ascending order of page numbers equals an integer m, the minimum chapter number $C_{min}$ of the fourth read image generated subsequently to the third read image would equal m+1 except for images whose chapter number is "none". Hence, in this case, the determination unit 1007 may determine that there is a missing page between the third and fourth read images if the minimum chapter number $C_{min}$ of the fourth read image is larger than m+1. For a target original read in descending order of page numbers, a reversed relationship may be applied. Similar relationships of figure numbers, table numbers and mathematical expression numbers may be used for the determination.

The determination unit 1007 iterates the above determination for each pair of read images generated consecutively from the target original. In a case where it is determined that there is no missing page in all of the pairs, the reading of the target original ends normally. On the other hand, in a case where it is determined by the determination unit 1007 that there is a missing page in the read images of the target original, the control unit 130 causes the image reading unit 100 to suspend reading of subsequent pages, and notifies a user that a missing page has occurred in a similar way to the first embodiment example. The notification may be performed in the manner described above in connection with FIGS. 6 and 7.

Figure 13:
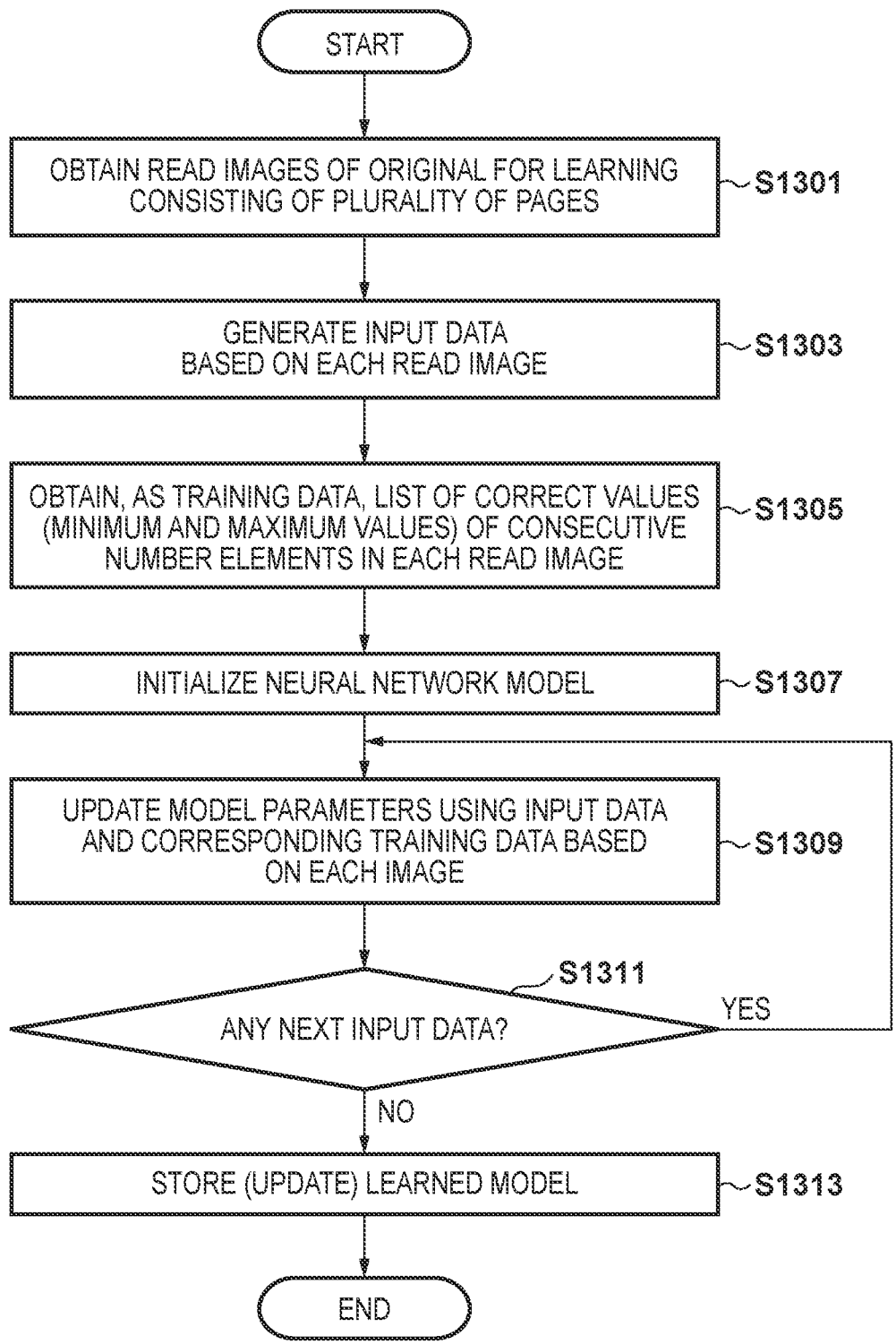
FIG. 13 is a flowchart illustrating an example of a flow of a process in learning stage according to the second example embodiment.

FIG. 13 is a flowchart illustrating an example of a flow of a process in learning stage according to the present example embodiment. The process illustrated in FIG. 13 is performed under control of the CPU 211 that executes a computer program loaded to the RAM 212, unless otherwise stated.

Since S1301, S1303, S1307 and S1313 of FIG. 13 may be the same as S801, S803, S807 and S813 of FIG. 8, descriptions thereof will be omitted herein to avoid redundancy.

At S1305, the control unit 130 obtains a list of values (for example, the minimum and maximum values) of consecutive number elements in each read image as training data for learning. The list obtained here may correctly indicate, for the page number element and at least one type of non-page number element, the minimum and maximum values of the respective types.

At S1309, the learning unit 1003 updates model parameters using the input data generated at S1303 and the corresponding training data (correct values of consecutive number elements) in the list obtained at S1305. This action may be iterated until it is determined at S1311 that there remains no next input data to be processed. Through the iterations at S1309, a learned model that reflects correlations between input data based on read images and values of consecutive number elements in the read images is derived.

Figure 14:
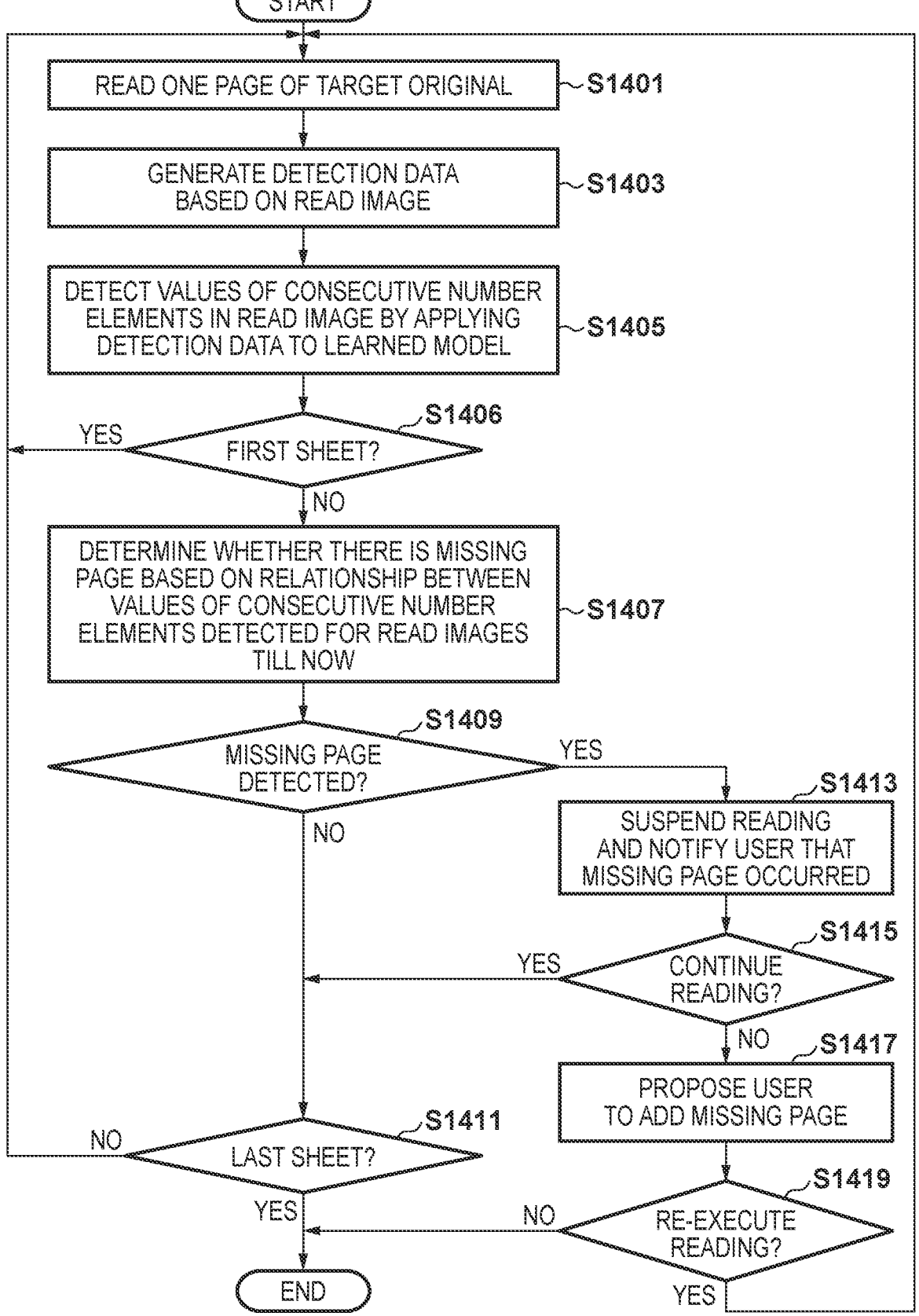
FIG. 14 is a flowchart illustrating an example of a flow of a process in reading stage according to the second example embodiment.

FIG. 14 is a flowchart illustrating an example of a flow of a process in reading stage according to the present example embodiment. The process illustrated in FIG. 14 is performed under control of the CPU 211 that executes a computer program loaded to the RAM 212, unless otherwise stated.

Since S1401 and S1409 to S1419 of FIG. 14 may be the same as S901 and S909 to S919 of FIG. 9, descriptions thereof will be omitted herein to avoid redundancy.

At S1403, the preprocessing unit 1001 generates detection data based on a read image input from the image reading unit 100. For example, the preprocessing unit 1001 generates a data set that includes a set of character objects of characters recognized in the read image and a set of image objects. The preprocessing unit 1001 stores the generated detection data in the data memory 1002.

Next, at S1405, the detection unit 1005 detects values of consecutive number elements (for example, the minimum and maximum values of respective types of consecutive number elements) in the read image by applying the generated detection data to the learned model stored in the model storage unit 1004. The detection unit 1005 stores the detected values of the consecutive number elements in the number information storage unit 1006.

In a case where the read sheet is the first sheet in the target original, S1401 to S1405 are iterated once again (S1406) to detect values of the consecutive number elements for a read image of the second sheet.

Next, at S1407, the determination unit 1007 determines whether there is a missing page in the read images based on relationship between values of consecutive number elements detected for the read images so far. The determination may be performed from the viewpoint of whether there is a missing number regarding the page number element and at least one type of non-page number element as described above. For example, when it is not possible to make a definitive conclusion about the presence or absence of the missing page from values of page number elements, the presence or absence of the missing page may be determined from values of non-page number elements. However, priorities among the types of consecutive number elements are not limited to the above example.

As above, the second embodiment example has been described in detail using FIGS. 10 to 14. According to the present embodiment example, a learned model for detecting a value of a consecutive number element described in each page of a target original tom detection data based on a read image of the page is derived through machine learning using images of an original for learning, the target original consisting of a plurality of pages. The machine learning is performed using input data based on an image of each page of the original for learning; and training data that indicates a value of a consecutive number element described in each page. After that, a value of the consecutive number element described in each read image is detected by applying, to the derived learned model, the detection data based on each read image of the target original. In this manner, it is determined whether there is a missing page in the read images based on relationship between values of consecutive number elements detected for two or more read images. According to such a configuration, it is possible to perform missing page determination, without relying only on page numbers, on the basis of whether an appropriate relationship between values of various consecutive number elements included in the original is maintained in the read data.

According to the present embodiment example, a minimum value and a maximum value, within each read image, of consecutive number elements described in the read image may be detected, and the determination about the presence or absence of the missing page may be done based on relationship between pages regarding the minimum and maximum values. According to such a configuration, a missing page can be found, if any, by considering whether any value is missing for the consecutive number elements (any skipped number).

According to the present embodiment example, the consecutive number element may include a page number element and at least one type of non-page number element. The non-page number element may be a chapter number element, a figure number element, a table number element, or a mathematical expression number element, for example. Then, in a case where it cannot be determined whether there is a missing page based on the minimum value and the maximum value detected for the page number element, it may be determined whether there is a missing page based on the minimum value and the maximum value detected for each of the non-page number elements. According to such a configuration, the entire accuracy of the determination can be enhanced by performing relatively reliable determination based on the page number elements with higher priority, and complementarily performing missing page determination based on the non-page number elements when it is difficult to derive a solution from the page number elements.

4. Modification Examples

The present invention is not limited to the above embodiments, and various modifications can be made thereto. For example, though an example where the image reading apparatus 10 performs both of the processes in the learning and reading stages has been described above, the process in the learning stage may be performed by a different information processing apparatus (for example, a learning server) than the image reading apparatus 10. Likewise, a part of the process in the reading process may be performed by a different information processing apparatus (for example, a missing page determination server) than the image reading apparatus 10.

The input data, the determination data and the detection data for machine learning may be in a different form than the examples described in connection with FIGS. 4 and 11. For example, instead of the coordinates data and the attribute data per character, coordinates data and attribute data per word may be utilized for machine learning. Recognition of words from a string may be achieved using any publicly-known morphological analysis technology, for example. In order to take context information that is resident in text data into consideration in machine learning, a recurrent neural network model may be utilized.

5. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-177784, filed on Sep. 27, 2019, which is hereby incorporated by reference herein in its entirety.

What is claimed is:

1. An image reading apparatus comprising:
a reading unit configured to sequentially read respective pages of a target original consisting of a plurality of pages to generate read images of the respective pages; and
a determining unit configured to determine whether there is a missing page in the read images of the target original generated by the reading unit,
wherein the determining unit is configured to determine whether there is a missing page in the read images of the target original by applying, to a learned model, determination data based on a pair of consecutively-generated read images of the target original, the learned model having been derived through machine learning using: input data based on image pairs of consecutive pages of an original for learning and image pairs of non-consecutive pages of the original for learning; and training data that indicates whether each image pair is a pair of consecutive pages.

2. The image reading apparatus according to claim 1, wherein
the determination data includes a set of character objects for each of a first read image and a second read image constituting the pair of the read images, and each character object includes in-page coordinates data, character code data and character attribute data.

3. The image reading apparatus according to claim 2, wherein
the determination data further includes a set of image objects for each of the first read image and the second read image, and each image object includes in-page coordinates data and vector data.

4. An image reading apparatus comprising:
a reading unit configured to sequentially read respective pages of a target original consisting of a plurality of pages to generate read images of the respective pages;
a detection unit configured to detect a value of a consecutive number element described in each read image by applying, to a learned model, detection data based on each read image of the target original, the learned model having been derived through machine learning using: input data based on an image of each page of an original for learning; and training data that indicates a value of a consecutive number element described in each page; and
a determining unit configured to determine whether there is a missing page between a first read image and a second read image of the target original based on relationship between a value of the consecutive number element detected by the detecting unit for the first read image and a value of the consecutive number element detected by the detecting unit for the second read image.

5. The image reading apparatus according to claim 4, wherein
the detection unit is configured to detect, within each read image, a minimum value and a maximum value of consecutive number elements described in the read image, and
the determining unit is configured to determine that there is a missing page between the first read image and the second read image in a case where there is a missing number between the maximum value detected in the first read image and the minimum value detected in the second read image or between the minimum value detected in the first read image and the maximum value detected in the second read image.

6. The image reading apparatus according to claim 5, wherein
the consecutive number element includes at least one type of non-page number element.

7. The image reading apparatus according to claim 6, wherein
the non-page number element includes a chapter number element, a figure number element, a table number element, or a mathematical expression number element.

8. The image reading apparatus according to claim 6, wherein
the consecutive number element includes a page number element and the at least one type of non-page number element,
the detection unit is configured to detect the minimum value and the maximum value described in each read image for each type of the page number element and the non-page number element, and
in a case where it cannot be determined whether there is a missing page based on the minimum value and the maximum value for the page number element, the determining unit is configured to determine whether there is a missing page based on the minimum value and the maximum value for the non-page number element.

9. The image reading apparatus according to claim 1, further comprising
a control unit configured to notify a user that a missing page has occurred in a case where it has determined by the determining unit that there is a missing page in the read images of the target original.

10. The image reading apparatus according to claim 9, wherein
the control unit is configured to cause previews of read images, immediately preceding and succeeding a page that has been determined to be missing, to be displayed on a screen along with a message notifying that a missing page has occurred.

11. The image reading apparatus according to claim 1, further comprising
a control unit configured to cause the reading unit to suspend reading of subsequent pages when the determining unit has determined that there is a missing page in the read images of the target original, and inquire of a user whether to continue reading of the subsequent pages or not.

12. A determination method for determining whether there is a missing page in read images of a target original consisting of a plurality of pages, the determination method comprising:
sequentially reading respective pages of the target original to generate read images of the respective pages; and
determining whether there is a missing page in the read images of the target original by applying, to a learned model, determination data based on a pair of consecutively-generated read images of the target original, the learned model having been derived through machine learning using: input data based on image pairs of consecutive pages of an original for learning and image pairs of non-consecutive pages of the original for learning; and training data that indicates whether each image pair is a pair of consecutive pages.

13. A non-transitory computer-readable storage medium having stored therein a computer program for causing a processor to perform operations to determine whether there is a missing page in read images of a target original consisting of a plurality of pages, the operations comprising:
sequentially reading respective pages of the target original to generate read images of the respective pages; and
determining whether there is a missing page in the read images of the target original by applying, to a learned model, determination data based on a pair of consecutively-generated read images of the target original, the teamed model having been derived through machine learning using: input data based on image pairs of consecutive pages of an original for learning and image pairs of non-consecutive pages of the original for learning; and training data that indicates whether each image pair is a pair of consecutive pages.

14. A learning apparatus comprising:
an obtaining unit configured to obtain input data based on image pairs of consecutive pages of an original for learning and image pairs of non-consecutive pages of the original for learning, and training data that indicates whether each image pair is a pair of consecutive pages; and
a learning unit configured to derive, through machine learning using the input data and the training data obtained by the obtaining unit, a learned model for determining whether there is a missing page in read images of a target original consisting of a plurality of pages.

15. A learning method for deriving a learned model, the learning method comprising:
obtaining input data based on image pairs of consecutive pages of an original for learning and image pairs of non-consecutive pages of the original for learning, and training data that indicates whether each image pair is a pair of consecutive pages; and
deriving, through machine learning using the obtained input and training data, the learned model for determining whether there is a missing page in read images of a target original consisting of a plurality of pages.

16. A non-transitory computer-readable storage medium having stored therein a computer program for causing a processor to perform operations to derive a learned model, the operations comprising:
obtaining input data based on image pairs of consecutive pages of an original for learning and image pairs of non-consecutive pages of the original for learning, and training data that indicates whether each image pair is a pair of consecutive pages; and
deriving, through machine learning using the obtained input and training data, the learned model for determining whether there is a missing page in read images of a target original consisting of a plurality of pages.

17. A determination method for determining whether there is a missing page in read images of a target original consisting of a plurality of pages, the determination method comprising:
- sequentially reading respective pages of the target original to generate read images of the respective pages;
- detecting a value of a consecutive number element described in each read image by applying, to a learned model, detection data based on each read image of the target original, the learned model having been derived through machine learning using: input data based on an image of each page of an original for learning; and training data that indicates a value of a consecutive number element described in each page; and
- determining whether there is a missing page between a first read image and a second read image of the target original based on relationship between a value of the consecutive number element detected for the first read image and a value of the consecutive number element detected for the second read image.

18. A non-transitory computer-readable storage medium having stored therein a computer program for causing a processor to perform operations to determine whether there is a missing page in read images of a target original consisting of a plurality of pages, the operations comprising:
- sequentially reading respective pages of the target original to generate read images of the respective pages;
- detecting a value of a consecutive number element described in each read image by applying, to a learned model, detection data based on each read image of the target original, the learned model having been derived through machine learning using: input data based on an image of each page of an original for learning; and training data that indicates a value of a consecutive number element described in each page; and
- determining whether there is a missing page between a first read image and a second read image of the target original based on relationship between a value of the consecutive number element detected for the first read image and a value of the consecutive number element detected for the second read image.

19. A learning apparatus comprising:
- an obtaining unit configured to obtain input data based on an image of each page of an original for learning, and training data that indicates a value of a consecutive number element described in each page; and
- a learning unit configured to derive, through machine learning using the input data and the training data obtained by the obtaining unit, a learned model for detecting a value of a consecutive number element described in each page from detection data based on a read image of each page of a target original consisting of a plurality of pages.

20. A learning method for deriving a learned model, the learning method comprising:
- obtaining input data based on an image of each page of an original for learning, and training data that indicates a value of a consecutive number element described in each page; and
- deriving, through machine learning using the obtained input and training data, the learned model for detecting a value of a consecutive number element described in each page from detection data based on a read image of each page of a target original consisting of a plurality of pages.

21. A non-transitory computer-readable storage medium having stored therein a computer program for causing a processor to perform operations to derive a learned model, the operations comprising:
- obtaining input data based on an image of each page of an original for learning, and training data that indicates a value of a consecutive number element described in each page; and
- deriving, through machine learning using the obtained input and training data, the learned model for detecting a value of a consecutive number element described in each page from detection data based on a read image of each page of a target original consisting of a plurality of pages.

* * * * *